US009716552B2

(12) United States Patent
Doerr

(10) Patent No.: US 9,716,552 B2
(45) Date of Patent: Jul. 25, 2017

(54) OTDM COHERENT TRANSCEIVER

(71) Applicant: Acacia Communications, Inc., Maynard, MA (US)

(72) Inventor: Christopher Doerr, Middletown, NJ (US)

(73) Assignee: Acacia Communications, Inc., Maynard, MA (US)

( * ) Notice: Subject to any disclaimer, the term of this patent is extended or adjusted under 35 U.S.C. 154(b) by 176 days.

(21) Appl. No.: 13/956,189

(22) Filed: Jul. 31, 2013

(65) Prior Publication Data

US 2014/0036937 A1   Feb. 6, 2014

Related U.S. Application Data

(60) Provisional application No. 61/677,643, filed on Jul. 31, 2012.

(51) Int. Cl.
| | | |
|---|---|---|
| *H04B 10/40* | (2013.01) | |
| *H04J 14/08* | (2006.01) | |
| *H04Q 11/00* | (2006.01) | |
| *G02B 6/28* | (2006.01) | |
| *H04B 10/50* | (2013.01) | |

(52) U.S. Cl.
CPC ........... *H04B 10/40* (2013.01); *G02B 6/2861* (2013.01); *H04B 10/5053* (2013.01); *H04J 14/08* (2013.01); *H04Q 11/0066* (2013.01)

(58) Field of Classification Search
USPC ........................................................ 398/135
See application file for complete search history.

(56) References Cited

U.S. PATENT DOCUMENTS

| | | | | |
|---|---|---|---|---|
| 7,110,677 | B2* | 9/2006 | Reingand et al. | 398/98 |
| 2003/0058504 | A1* | 3/2003 | Cho | H04L 7/0075 |
| | | | | 398/147 |
| 2007/0009264 | A1* | 1/2007 | Kamio | H04B 10/505 |
| | | | | 398/102 |
| 2008/0080859 | A1* | 4/2008 | Kagawa | 398/42 |
| 2009/0080895 | A1* | 3/2009 | Zarris | 398/98 |
| 2010/0021166 | A1* | 1/2010 | Way | 398/79 |
| 2011/0097085 | A1* | 4/2011 | Oda et al. | 398/65 |

OTHER PUBLICATIONS

Nguyen, et al, "Demultiplexing Techniques of 320 Gb/s OTDM-DQPSK Signals: A Comparison by Simulation", 2010 IEEE International Conference on Communication Systems (ICCS), Nov. 2012, pp. 171-175.*
Zhang, et al, "Demodulation of 1.28-Tbit/s Polarization-multiplexed 16-QAM Signals on a Single Carrier with Digital Coherent Receiver", 2009 Conference on Optical Fiber Communication, Mar. 2009, pp. 1-3.*
Malouin, C. et al.,"Sub-Rate Sampling in 100 Gb/s Coherent Optical Receivers," Optical Fiber Communication Conference, 2010, p. OthT3.

(Continued)

*Primary Examiner* — Michael Thier
*Assistant Examiner* — Kent Krueger
(74) *Attorney, Agent, or Firm* — Wolf, Greenfield & Sacks, P.C.

(57) ABSTRACT

An OTDM coherent transceiver and related methods and apparatus that employ a pulsed source which advantageously allows higher symbol rates without requiring higher speed electronics.

20 Claims, 3 Drawing Sheets

(56) References Cited

OTHER PUBLICATIONS

Nagarajan, R. et al., "10 Channel, 100Gbit /s per Channel, Dual Polarization, Coherent QPSK, Monolithic InP Receiver Photonic Integrated Circuit," Optical Fiber Communication Conference, 2011, p. OML7.

Taillaert, D. et al., "A compact two-dimensional grating coupler used as a polarization splitter," IEEE Photonics Technology Letters, vol. 15, No. 9, pp. 1249-1251, Sep. 2003. Available: http://ieeexplore.ieee.org/lpdocs / epic03/wrapper .htm?arnumber=1224595.

* cited by examiner

OTDM COHERENT TRANSCEIVER

CROSS REFERENCE TO RELATED APPLICATIONS

This application claims the benefit of U.S. Provisional Patent Application Ser. No. 61/677,643 filed Jul. 31, 2012 which is incorporated by reference in its entirety as if set forth at length herein.

TECHNICAL FIELD

This disclosure relates generally to the field of optical communications and in particular to an optical time division multiplexed (OTDM) coherent transceiver.

BACKGROUND

Contemporary optical communications and related systems require an increasingly greater symbol rate to meet ever increasing capacity demands for such communications. Attempts at increasing the symbol rate of such systems however, are oftentimes accompanied by a corresponding increase in the speed of associated electronics. Consequently, methods, structures and systems that enhance the symbol rate of optical communications systems while not requiring a corresponding increase in electronic performance, would represent a welcome addition to the art.

SUMMARY

An advance in the art is made according to an aspect of the present disclosure directed to methods, structures and systems for OTDM optical communications and in particular an OTDM optical transceiver.

Operationally, and according to an aspect of the present disclosure, the OTDM optical transceiver integrates both a receiver and a transmitter on a single chip and employs a pulsed optical input signal. More particularly, in response to the receipt of the pulsed optical signal—the transceiver generates a number of delayed optical pulses which are subsequently used by both the receiver and the transmitter.

Advantageously, a transceiver according to the present disclosure does not require temperature stabilized PICs, generates a high baud rate signal that is tolerant to nonlinearities and laser line width, it allows for a very high spectral efficiency, and it does not require long finite-impulse response filters in the DAC(s).

BRIEF DESCRIPTION OF THE DRAWING

A more complete understanding of the present disclosure may be realized by reference to the accompanying drawings in which.

DETAILED DESCRIPTION

Figure 1:
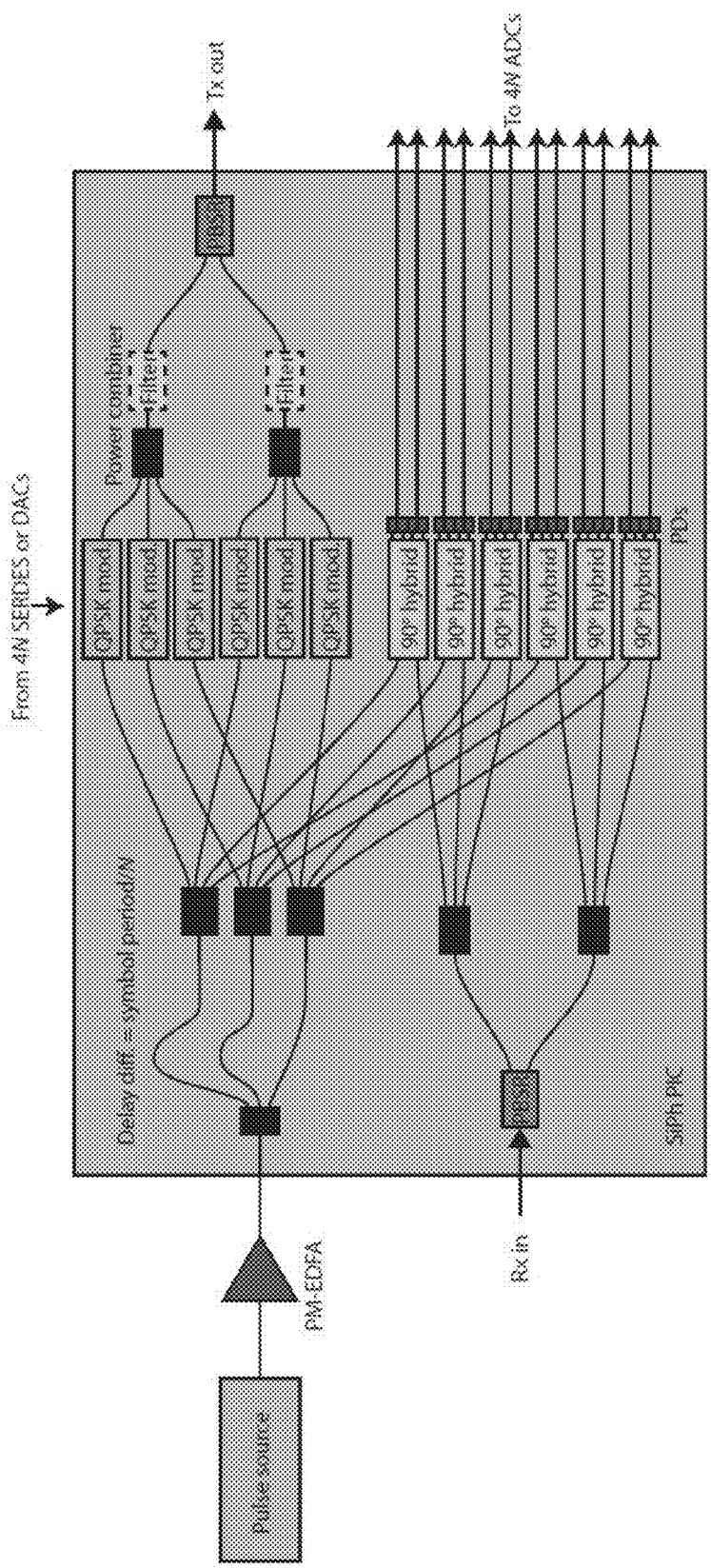
FIG. 1 shows a schematic of a single chip, optical time-division multiplexing (OTDM) transceiver according to an aspect of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, it is noted that— in the prior art—in order to increase the data rate exhibited by a coherent transceiver, one could increase the speed of the electronics (i.e., analog-to-digital converters (ADCs), digital-to-analog converters (DACs)), to increase the baud rate, increase the number of points in constellations used, or increase the number of carriers used (i.e., wavelength-division-multiplexing (WDM) or orthogonal frequency-division multiplexing (OFDM)). However, as is known by those skilled in the art, the speed of the electronics is limited by the technology(ies) employed and the number of constellation points is limited by the required sensitivity.

More particularly, a multicarrier transceiver exhibits a poor spectral efficiency unless one uses long finite-impulse response filters in the DAC to generate steep "side walls", and the nonlinear tolerance is limited by the nonlinear tolerance of each carrier—unless joint processing is performed, which significantly adds to the complexity. Furthermore, temperature-stabilized filters are usually required with Wavelength Division Multiplexing/Orthogonal Frequency Division Multiplexing (WDM/OFDM) approaches.

R. Nagarajan et. al., in an article entitled "10 Channel, 100 Gbit/s per Channel, Dual Polarization Coherent QPSK, Monolithic InP Receiver Photonic Integrated Circuit", which was presented at Optical Fiber Communication Conference in 2011 and published at p.OML7, described a multicarrier InP coherent receiver. As described, the receiver includes 10 integrated lasers, which those skilled in the art will readily appreciate are difficult to make with high yield on a single chip and as all of the lasers must be wavelength stabilized. Additionally, it employed separate chips for transmit and receive—requiring additional packaging than a single chip. Additionally, it exhibited poor spectral efficiency as the lasers are limited by their wavelength stability to a relatively wide wavelength separation. Finally, its channels are narrow-band and therefore susceptible to non-linearities.

In sharp contrast, and according to an aspect of the present disclosure, a single chip transmitter/receiver (transceiver) is described which provides a higher baud rate signal through the effect of optical time-division multiplexing (OTDM). A schematic of such a device is shown schematically in FIG. 1.

With reference to that FIG. 1, there is shown a single chip, Silicon Photonics, Photonic Integrated Circuit (SiPh PIC) including both receiver and transmitter integrated onto the single chip. As shown, optical output from a pulsed source (i.e., laser) is applied to a polarization maintaining—Er-doped fiber amplifier (PM-EDFA), the output of which is applied to the transmitter input—a 1×N splitter (where N=3 in the FIGURE). At this point those skilled in the art will appreciate that while a 1×3 splitter is shown in this exemplary embodiment, the specific configuration and/or number of splits may vary depending upon the type of transceiver constructed.

The output of the 1×3 splitter is directed into three (N) unequal length waveguides which in turn are optically connected to three, 1×4 splitters. As implemented the unequal length waveguides are constructed such that they each exhibit an increasing delay differential with respect to one another, wherein the delay differential is substantially equal to a symbol period/N.

The outputs of the three 1×4 splitters are further directed to a series of six (2N) Quadrature Phase Shift Keying (QPSK) modulators and 90 degree hybrids. As shown schematically in FIG. 1, two of the outputs of each of the 1×4 splitters are directed to two of the QPSK modulators while the remaining two of the outputs of each of the 1×4 splitters are directed to two of the 90 degree hybrids. For example, the outputs of the first 1×4 splitter are directed to the first and fourth QPSK modulator and the first and fourth 90 degree hybrids. Similarly, the four outputs of the second 1×4 splitter are directed to the second and fifth QPSK modulators and the second and fifth 90 degree hybrids. Finally, the four outputs of the third 1×4 splitter is directed to the third and sixth QPSK modulator and the third and 6$^{th}$ 90 degree hybrids.

Each of the QPSK modulators are driven by a number (4N) of serializers/deserializers (SERDES) or digital to analog converters (DACs) and the outputs of the modulators are combined through the effect of a power combiner, filtered, and finally combined through the effect of a polarization splitter and rotator (PBSR) and output as TxOut. As shown in FIG. 1, three of the QPSK modulator (modulators 1-3) outputs are combined by a single power combiner and the other three QPSK modulator (modulators 4-6) outputs are combined by a second power combiner, the filtered outputs of which are combined by the PBSR prior to output.

As may be appreciated by those skilled in the art, the effect of applying a pulsed input to the first 1×3 splitter and then delaying the output(s) of that splitter through the effect of the unequal length waveguides as the effect of "producing" a series of pulses applied to the 1×4 splitters delayed by an amount equal to the symbol period/N. Consequently, an effective series of pulses is produced from each single pulse received from the pulse source.

With continued reference to FIG. 1 and in particular with respect to the receiver portion of the transceiver, it may be observed that a received signal Rx in is applied to a polarization splitter and rotator (PBSR) which splits the received signal and applies the split signals to two, 1×3 splitters which in turn direct their outputs to the series of six 90 degree hybrids. The 90 degree hybrids, which as noted previously each receive pulses output from the three 1×4 splitters comprising the transmitter—are output to a respective photodetector the outputs of which are further directed to a series of 4N ADCs. As may be appreciated at this point by those skilled in the art, the pulsed inputs to the 90 degree hybrids (from the transmitter 1×4 splitters) serve as pulsed local oscillators for the 90 degree hybrids.

It may be readily understood that Si photonics chips are preferred for these embodiments as they produce high yields and exhibit high index contrast. Operationally, the first pulsed source—which may reside on a separate chip—generates the optical pulses as input. The pulses are shorter or equal to the desired symbol period T. The pulses are amplified and applied to a second PIC (the transceiver) where they are split into N copies—where TN is the symbol period. The N copies are selectively time delayed by a different integer number T—through the effect of the unequal length waveguides—and then split further. Those skilled in the art will appreciate that the order of the time delaying and splitting may be interchanged or varied such that particular one(s) of the signals are time delayed before splitting and particular one(s) split after.

Portions of the time delayed, split signals are applied to an array of 2N, I-Q modulators exhibiting a symbol period of TN. The signals are then combined for each target polarization, and one of the two target polarizations is rotated to an orthogonal polarization and then polarization combined through the effect of the PBSR. Consequently, an OTDM transmit signal is produced from lower speed tributaries.

Notably, the PBSR may be—for example—a 2D grating coupler. Those skilled in the art will readily appreciate that such a 2D grating coupler advantageously provides both polarization splitting and rotation in one compact device. Show further in FIG. 1, are the tunable optical filters—one for each polarization—positioned in the transmitter immediately before the PBRS. Such filters advantageously narrow the spectrum of the OTDM signal, converting it from RZ to NRZ thereby increasing the spectral efficiency. Importantly, the ultimate OTDM signal may be made indistinguishable from a signal created directly by higher speed DACs. Consequently, the high-baud rate signal may take advantage of the nonlinear tolerance improvement found as baud rate is increased.

With respect to the receiver portion of the PIC, time-delayed split portions output from the 1×4 splitters that are not directed to the modulators are directed to the 90 degree hybrids of the receiver where they serve substantially as pulsed local oscillators. Accordingly, signals received at receiver input (Rx in) are polarization split and rotated through the effect of a PBSR and subsequently split to 2N 90 degree hybrids. As noted previously, the time-delayed split (pulsed local oscillator) signals provide other input to the hybrids. The hybrid outputs are directed to photodetectors and finally to a digital signal processor. Operationally, the pulsed local oscillator demultiplexes the OTDM received signal into low-speed tributaries. The DSP therefore must perform joint processing on the tributaries to compensate the chromatic and polarization mode dispersion. Advantageously, this may be pipelined in the DSP and should not require any extra power consumption as compared to N times the power consumption of processing a single tributary.

As may be further understood, the pulse timing must be synchronized between both transceivers at each end of a link. Accordingly, for a given transceiver pair, one operates as a master and the other as a slave. The master has a free-running clock for the pulses, and the slave synchronizes its pulses to the master's clock. Alternatively, one could have both transceivers of a transceiver pair "slave" off of each other using a fast control loop while both slave to a reference clock using a slow control loop.

Figure 2:
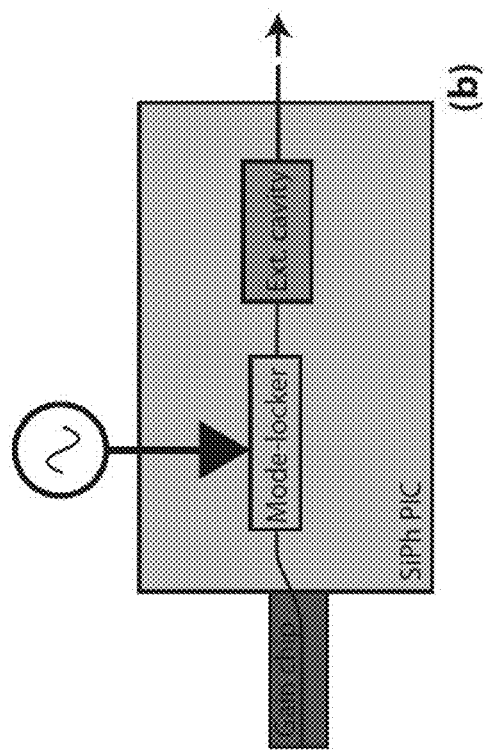
FIGS. 2(a) and 2(b) show a schematic of pulse generating chips use—for example—with the transceiver of FIG. 1, where 2(a) employs a continuous wave (cw) laser and an external pulse carver and 2(b) employs an actively mode-locked laser, according to an aspect of the present disclosure.
Figure 2:
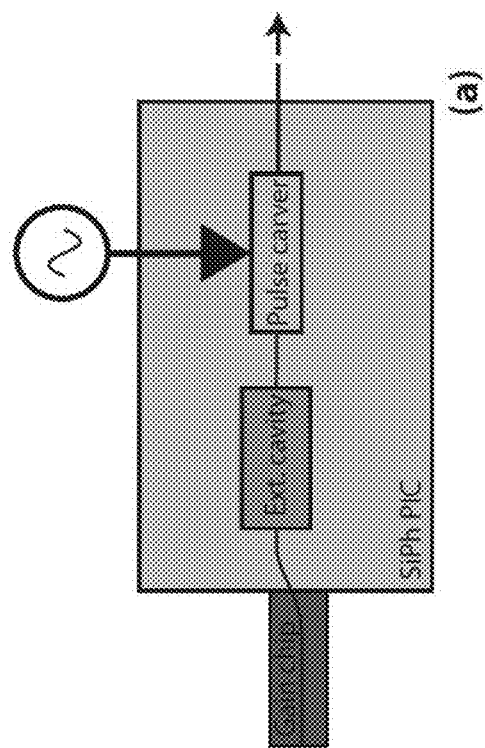

FIGS. 2(a) and 2(b) show in schematic form pulse generating chips that may advantageously operate with the transceiver PIC according to the present disclosure. More particularly, FIG. 2(a) shows a CW laser that is externally modulated comprising a gain chip, the output of which is input to an ext. cavity which in turn is applied to a pulse carver. Similarly, FIG. 2(b) shows a mode-locked laser suitable for applying pulsed input to a transceiver according to the present disclosure.

Figure 3:
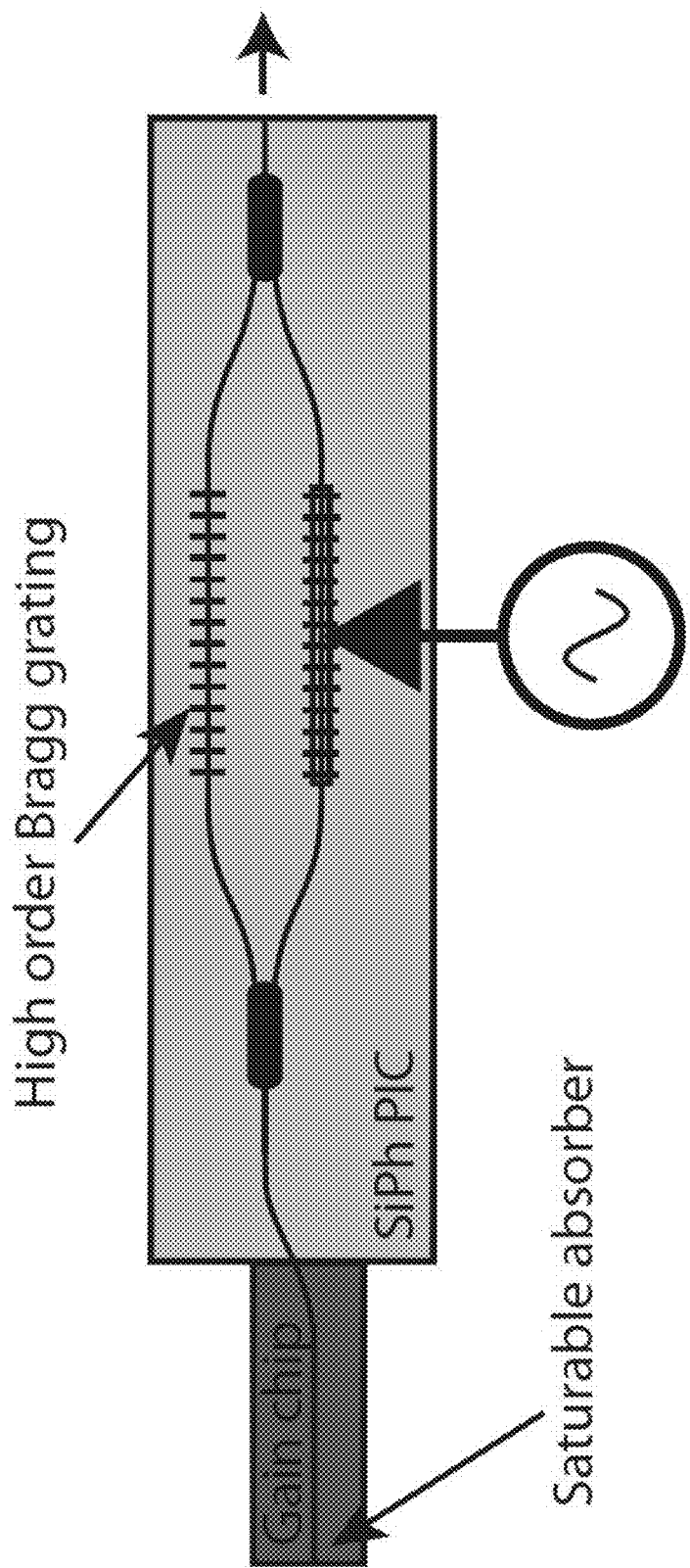
FIG. 3 shows a schematic of a mode-locked laser with a modulated Bragg grating which may provide pulse generation according to an aspect of the present disclosure.

FIG. 3 shows an exemplary mode-locked laser design having a modulated Bragg grating for use with the transceiver PIC of the present disclosure. More specifically, the mode locked laser includes two high-order (of sampled) Bragg reflectors with slightly different periods. One of the Bragg reflectors includes a modulaton that is electrically driven at a desired pulse rate. Also included are DC phase shifters that ensure that reflected signals from the two gratings are in phase and that the transmitted signals are also in phase. In addition, there is an optional saturable absorber in the gain chip to shorten the pulses. The saturable absorber may advantageously be a section of gain medium that is reverse biased.

Those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. An optical time-division multiplexed (OTDM) coherent transceiver comprising:
    an input waveguide;
    an optical transmitter;
    an optical receiver; and
    a first optical splitter connected to the input waveguide and configured to divide a signal from the input waveguide to N differential delay waveguides that are connected between the first optical splitter and N second optical splitters, wherein the N differential delay waveguides provide differential delays corresponding to integer multiples of a symbol period of the signal divided by N, and wherein the N second optical splitters are coupled to inputs of both the optical transmitter and the optical receiver, a first N outputs from the N second optical splitters being optically connected to the optical receiver and a second N outputs from the N second optical splitters being optically connected to the optical transmitter, the N second optical splitters being between the first optical splitter and the optical transmitter, wherein the differential delays for the first N outputs optically connected to the optical receiver and the differential delays for the second N outputs optically connected to the optical transmitter are the same.

2. The OTDM coherent transceiver of claim 1, further comprising 2N quadrature phase-shift keying (QPSK) modulators in the optical transmitter optically connected to the N second optical splitters.

3. The OTDM coherent transceiver of claim 2, wherein the N second optical splitters each connect to plural intermediate waveguides and a first intermediate waveguide of the plural intermediate waveguides connects to a first N of the 2N QPSK modulators and a
    second intermediate waveguide of the plural intermediate waveguides connects to a second N of the 2N QPSK modulators.

4. The OTDM coherent transceiver of claim 2, further comprising:
    a first power combiner connected to output waveguides from a first N of the 2N QPSK modulators;
    a second power combiner connected to output waveguides from a second N of the 2N QPSK modulators; and
    a polarization splitter and rotator connected to output waveguides from the first power combiner and second power combiner and arranged to combine signals from the first power combiner and second power combiner onto a transmitter output waveguide.

5. The OTDM coherent transceiver of claim 2, further comprising 2N 90-degree hybrids in the optical receiver connected to an input waveguide of the optical receiver.

6. The OTDM coherent transceiver of claim 5, wherein the N second optical splitters each have plural intermediate waveguides and
    a first intermediate waveguide of the plural intermediate waveguides connects to a first N of the 2N QPSK modulators;
    a second intermediate waveguide of the plural intermediate waveguides connects to a second N of the 2N QPSK modulators;
    a third intermediate waveguide of the plural intermediate waveguides connects to a first N of the 2N 90-degree hybrids; and
    a fourth intermediate waveguide of the plural intermediate waveguides connects to a second N of the 2N 90-degree hybrids.

7. The OTDM coherent transceiver of claim 5, further comprising a polarization splitter and rotator optically connected between the input waveguide of the optical receiver and the 2N 90-degree hybrids.

8. The OTDM coherent transceiver of claim 7, wherein a first output of the polarization splitter and rotator optically connects to a first N of the 2N 90-degree hybrids and a second output of the polarization splitter and rotator optically connects to a second N of the 2N 90-degree hybrids.

9. The OTDM coherent transceiver of claim 5, wherein the optical transmitter and optical receiver are formed on a single chip.

10. The OTDM coherent transceiver of claim 9, further comprising an optical source coupled to the optical transmitter and configured to produce optical pulses.

11. The OTDM coherent transceiver of claim 10, wherein the optical source comprises a mode-locked laser having a Bragg grating configured to be modulated to produce the optical pulses.

12. A method for coherent optical communications, the method comprising:
dividing a received pulsed optical signal at in input to a transceiver onto N differential delay waveguides by a first optical splitter;
differentially delaying signals in the N differential delay waveguides by amounts corresponding to integer multiples of a symbol period of the pulsed optical signal divided by N;
providing, from N second optical splitters, output signals to inputs of both an optical transmitter and an optical receiver, including a first N differentially delayed outputs from the N differential delay waveguides to the optical receiver of the transceiver; and
providing, from the N second optical splitters, a second N differentially delayed outputs from the N differential delay waveguides to the optical transmitter of the transceiver, the N second optical splitters being between the first optical splitter and the optical transmitter, wherein the first N differentially delayed outputs and the second N differentially delayed outputs include a same amount of differential delay from the N differential delay waveguides.

13. The method of claim 12, further comprising:
dividing signals from each of the N differential delay waveguides into a plurality of intermediate waveguides;
providing signals from first intermediate waveguides of the plurality of intermediate waveguides to a first N quadrature phase-shift keying (QPSK) modulators of the optical transmitter; and
providing signals from second intermediate waveguides of the plurality of intermediate waveguides to a second N QPSK modulators of the optical transmitter.

14. The method of claim 13, further comprising driving the first N QPSK modulators and second N QPSK modulators to encode information on a plurality of optical signals.

15. The method of claim 13, further comprising:
combining outputs from the first N QPSK modulators with a first combiner;
combining outputs from the second N QPSK modulators with a second combiner; and
combining outputs from the first combiner and second combiner onto a transmitter output waveguide with a polarization splitter and rotator.

16. The method of claim 15, further comprising:
converting outputs from the first combiner and second combiner from return-to-zero encoding to non-return-to-zero encoding.

17. The method of claim 13, further comprising:
providing signals from third intermediate waveguides of the plurality of intermediate waveguides to a first N 90-degree hybrids of an optical receiver; and
providing signals from fourth intermediate waveguides of the plurality of intermediate waveguides to a second N 90-degree hybrids of the optical receiver.

18. The method of claim 17, further comprising:
dividing a received optical signal at an input to the optical receiver by a polarization splitter and rotator;
providing a first output from the polarization splitter and rotator to the first N 90-degree hybrids; and
providing a second output from the polarization splitter and rotator to the second N 90-degree hybrids.

19. The method of claim 12, further comprising modulating an optical source to generate the pulsed optical signal.

20. The method of claim 19, wherein modulating the optical source comprises modulating a Bragg grating of a mode-locked laser.

* * * * *